US007179522B2

(12) United States Patent
Hiel et al.

(10) Patent No.: US 7,179,522 B2
(45) **Date of Patent: *Feb. 20, 2007**

(54) ALUMINUM CONDUCTOR COMPOSITE CORE REINFORCED CABLE AND METHOD OF MANUFACTURE

(75) Inventors: Clement Hiel, Rancho Palos Verdes, CA (US); George Korzeniowski, Woodland Hills, CA (US); David Bryant, Laguna Beach, CA (US)

(73) Assignee: CTC Cable Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/971,629

(22) Filed: Oct. 22, 2004

(65) Prior Publication Data

US 2005/0129942 A1 Jun. 16, 2005

Related U.S. Application Data

(63) Continuation-in-part of application No. 10/692,304, filed on Oct. 23, 2003, now Pat. No. 7,060,326, and a continuation-in-part of application No. 10/691,447, filed on Oct. 22, 2003.

(51) Int. Cl.
*B32B 27/04* (2006.01)
*H02G 3/00* (2006.01)

(52) U.S. Cl. .............................. 428/300.7; 428/297.4; 428/299.4; 428/299.1; 428/298.1; 428/300.4; 428/378; 174/70 R; 174/102 R; 174/106 R; 174/113 C; 427/379; 427/389.7

(58) Field of Classification Search ............. 174/70 R, 174/102 R, 106 R, 113 C; 428/378; 427/372.2, 427/379, 389.7, 402, 407.2
See application file for complete search history.

(56) References Cited

U.S. PATENT DOCUMENTS 3,331,919 A 7/1967 Vayson (Continued)

FOREIGN PATENT DOCUMENTS

EP 0550784 A1 7/1993

(Continued)

OTHER PUBLICATIONS

Sucuma P. Elliot, "HECO puts new composite conductors to the test", Transmission and Distribution World, Jun. 1, 2003.

(Continued)

*Primary Examiner*—Jill Gray
(74) *Attorney, Agent, or Firm*—The McIntosh Group

(57) ABSTRACT

This invention relates to an aluminum conductor composite core reinforced cable (ACCC) and method of manufacture. An ACCC cable has a composite core surrounded by at least one layer of aluminum conductor. The composite core comprises a plurality of fibers from at least one fiber type in one or more matrix materials. The composite core can have a maximum operating temperature capability above 100° C. or within the range of about −45° C. to about 240° C. or higher, at least 50% fiber to resin volume fraction, a tensile strength in the range of about 160 Ksi to about 370 Ksi, a modulus of elasticity in the range of about 7 Msi to about 37 Msi and a coefficient of thermal expansion in the range of about $-0.6\times10^{-6}$ per deg. C. to about $1.0\times10^{-5}$ per deg. C. According to the invention, unique processing techniques such a B-Staging and/or film-coating techniques can be used to increase production rates from a few feet per minute to sixty or more feet per minute.

20 Claims, 4 Drawing Sheets

U.S. PATENT DOCUMENTS

| | | | | | |
|---|---|---|---|---|---|
| 3,599,679 | A | * | 8/1971 | Carter | 139/420 R |
| 3,692,924 | A | | 9/1972 | Nye | |
| 3,717,720 | A | | 2/1973 | Snellman | |
| 3,808,078 | A | | 4/1974 | Snellman | |
| 3,973,385 | A | | 8/1976 | Roe | |
| 4,059,951 | A | | 11/1977 | Roe | |
| 4,422,718 | A | | 12/1983 | Nakagome | |
| 4,441,787 | A | | 4/1984 | Lichtenberger | |
| 4,620,401 | A | * | 11/1986 | L'Esperance et al. | 52/309.15 |
| RE32,374 | E | | 3/1987 | Dey | |
| 4,690,497 | A | | 9/1987 | Occhini | |
| 4,763,981 | A | | 8/1988 | Wilkins | |
| 4,793,685 | A | | 12/1988 | Taylor | |
| 4,961,990 | A | | 10/1990 | Yamada | |
| 4,966,434 | A | | 10/1990 | Yonechi | |
| 5,068,142 | A | * | 11/1991 | Nose et al. | 442/50 |
| 5,082,397 | A | | 1/1992 | Raviv | |
| 5,122,622 | A | | 6/1992 | Reuss | |
| 5,198,173 | A | * | 3/1993 | Terzian et al. | 264/257 |
| 5,222,173 | A | | 6/1993 | Bausch | |
| RE34,516 | E | | 1/1994 | Houghton | |
| 5,296,456 | A | | 3/1994 | Shiga | |
| 5,304,619 | A | | 4/1994 | Yokoyama | |
| 5,451,355 | A | * | 9/1995 | Boissonnat et al. | 264/136 |
| 5,561,729 | A | | 10/1996 | Parris | |
| 5,626,700 | A | * | 5/1997 | Kaiser | 156/180 |
| 5,651,081 | A | | 7/1997 | Blew | |
| 5,808,239 | A | * | 9/1998 | Olsson | 174/113 C |
| 5,847,324 | A | | 12/1998 | Farquhar | |
| 5,917,977 | A | | 6/1999 | Barrett | |
| 6,007,655 | A | * | 12/1999 | Gorthala et al. | 156/166 |
| 6,180,232 | B1 | | 1/2001 | McCullough | |
| 6,245,425 | B1 | | 6/2001 | McCullough | |
| 6,270,856 | B1 | | 8/2001 | Hendewerk | |
| 6,343,172 | B1 | | 1/2002 | Schiestle | |
| 6,344,270 | B1 | | 2/2002 | McCullough | |
| 6,363,192 | B1 | | 3/2002 | Spooner | |
| 6,423,808 | B1 | | 7/2002 | Watanabe | |
| 6,447,927 | B1 | | 9/2002 | McCullough | |
| 6,463,198 | B1 | | 10/2002 | Coleman | |
| 6,528,729 | B1 | | 3/2003 | Kamata | |
| 6,568,072 | B2 | * | 5/2003 | Wilemon et al. | 29/825 |
| 7,015,395 | B2 | * | 3/2006 | Goldsworthy et al. | 174/102 R |
| 2002/0056508 | A1 | * | 5/2002 | Brandstrom | 156/180 |
| 2002/0088549 | A1 | * | 7/2002 | Fanucci et al. | 156/441 |
| 2002/0189845 | A1 | | 12/2002 | Gorrell | |
| 2004/0009338 | A1 | * | 1/2004 | Jo et al. | 428/297.4 |
| 2004/0026112 | A1 | * | 2/2004 | Goldsworthy et al. | 174/106 R |
| 2004/0182597 | A1 | * | 9/2004 | Smith et al. | 174/126.1 |
| 2006/0016616 | A1 | * | 1/2006 | Goldsworthy et al. | 174/128.1 |

FOREIGN PATENT DOCUMENTS

| | | | |
|---|---|---|---|
| EP | 0346499 | B1 | 5/1995 |
| EP | 0814355 | A1 | 12/1997 |
| EP | 1124235 | A2 | 8/2001 |
| EP | 1168374 | A2 | 1/2002 |
| EP | 1168374 | A3 | 1/2003 |
| WO | WO 95/34838 | | 12/1995 |

OTHER PUBLICATIONS

Office of Industrial Technologies, "Development of a Composite-Reinforced Aluminum Conductor", Dec. 2001.

Oak Ridge National Laboratory, "Power Grid of the Future", ONRL Review, vol. 35, No. 2, 2002, web-print.

Alcoa Conductor Products Company, T&D Conductors; Overhead; Underground; Building Wire:, Jul. 1, 1989, p. 33.

* cited by examiner

ALUMINUM CONDUCTOR COMPOSITE CORE REINFORCED CABLE AND METHOD OF MANUFACTURE

CROSS REFERENCES TO RELATED APPLICATIONS

This patent application is a US Continuation in Part application that claims priority to pending US Continuation in Part application Ser. No. 10/691,447 filed on 22 Oct. 2003 and pending US Continuation in Part application Ser. No. 10/692,304 filed on 23 Oct. 2003, now U.S. Pat. No. 7,060,326, each of which claims priority to earlier pending PCT application PCT/US03/12520 filed in the International Receiving Office of the United States Patent and Trademark Office on 23 Apr. 2003 which claims priority from U.S. Provisional application Ser. No. 60/374,879 filed in the United States Patent and Trademark Office on 23 Apr. 2002, the entire disclosure of which is incorporated by reference herein.

BACKGROUND OF THE INVENTION

The present invention relates to an aluminum conductor composite core (ACCC) reinforced cable and method of manufacture. More particularly, the present invention relates to a cable for providing electrical power having a composite core, formed by fiber reinforcements and a matrix, surrounded by aluminum conductor wires capable of carrying increased ampacity and operating at elevated temperatures.

In a traditional aluminum conductor steel reinforced cable (ACSR), the aluminum conductor transmits the power and the steel core provides the strength member. Conductor cables are constrained by the inherent physical characteristics of the components; these components limit ampacity. Ampacity is a measure of the ability to send power through the cable. Increased current or power on the cable causes a corresponding increase in the conductor's operating temperature. Excessive heat will cause the conventional cable to sag below permissible levels, as the relatively high coefficient of thermal expansion of the structural core causes the structural member to expand, resulting in cable sag. Typical ACSR cables can be operated at temperatures up to 75° C. on a continuous basis without any significant change in the conductor's physical properties related to sag. Operated above 100° C., for any significant length of time, ACSR cables suffer from a plastic-like and permanent elongation, as well as a significant reduction in strength. These physical changes create excessive line sag. Such line sag has been identified as one of the primary causes of the power blackout in the Northeastern United States in 2003. The temperature limits constrain the electrical load rating of a typical 230-kV line, strung with 795 kcmil ACSR "Drake" conductor, to about 400 MVA, corresponding to a current of 1000 A. Therefore, to increase the load carrying capacity of transmission cables, the cable itself must be designed using components having inherent properties that allow for increased ampacity without inducing excessive line sag.

Although ampacity gains can be obtained by increasing the conductor area that surrounds the steel core of the transmission cable, increasing conductor volume increases the weight of the cable and contributes to sag. Moreover, the increased weight requires the cable to use increased tension in the cable support infrastructure. Such large weight increases typically would require structural reinforcement or replacement of the electrical transmission towers and utility poles. Such infrastructure modifications are typically not financially feasible. Thus, there is financial motivation to increase the load capacity on electrical transmission cables while using the existing transmission structures and liens.

Attempts have been made to develop a composite core comprised of a single type of fiber and thermoplastic resin. The object was to provide an electrical transmission cable which utilizes a reinforced plastic composite core as a load bearing element in the cable and to provide a method of carrying electrical current through an electrical transmission cable which utilizes an inner reinforced plastic core. The single fiber/thermoplastic composite core failed in these objectives. A one fiber/thermoplastic system does not have the required physical characteristics to effectively transfer load while keeping the cable from sagging. Secondly, a composite core comprising glass fiber and thermoplastic resin does not meet the operating temperatures required for increased ampacity, namely, between 90° C. and 230° C., or higher.

Physical properties of thermoplastic composite cores are further limited by processing methods. Previous processing methods cannot achieve a high fiber to resin ratio by volume or weight. These processes do not allow for creation of a fiber rich core that will achieve the strength required for electrical cables. Moreover, the processing speed of previous processing methods is limited by inherent characteristics of the process itself. For example, traditional extrusion/pultrusion dies are approximately 36 inches long, having a constant cross section. The longer dies create increased friction between the composite and the die slowing processing time. The processing times in such systems for thermoplastic/thermoset resins range from about 3 inches/minute to about 12 inches/minute. Processing speeds using polyester and vinyl ester resins can produce composites at up to 72 inches/minute. With thousands of miles of cables needed, these slow processing speeds fail to meet the need in a financially acceptable manner.

It is therefore desirable to design an economically feasible cable that facilitates increased ampacity without corresponding cable sag. It is further desirable to process composite cores using a process that allows configuration and tuning of the composite cores during processing and allows for processing at speeds up to or above 60 ft/min.

BRIEF SUMMARY OF THE INVENTION

An aluminum conductor composite core (ACCC) reinforced cable can ameliorate the problems in the prior art. The ACCC cable is an electrical cable with a composite core comprised of one or more fiber type reinforcements embedded in a matrix. The composite core is wrapped with electrical conductor wires. An ACCC reinforced cable is a high-temperature, low-sag conductor, which can be operated at temperatures above 100° C. while exhibiting stable tensile strength and creep elongation properties. In exemplary embodiments, the ACCC cable can operate at temperatures above 100° C. and in some embodiments, above 240° C. An ACCC cable with a similar outside diameter may increase the line rating over a prior art cable by at least 50% without any significant changes in the overall weight of the conductor.

In accordance with the invention, in one embodiment, an ACCC cable comprises a core comprised of composite material surrounded by a protective coating. The composite material is comprised of a plurality of fibers selected from one or more fiber types and embedded in a matrix. The important characteristics of the ACCC cable are a relatively high modulus of elasticity and a relatively low coefficient of thermal expansion of the structural core. The ACCC core, which is also smaller in diameter, lighter in weight, and stronger than previous core designs, allows an increase the ampacity of the conductor cable, by allowing the addition of additional conductor material in the same overall area, with an approximately equal weight. It is further desirable to design composite cores having long term durability. The composite strength member should operate at a minimum of 40 years, and more preferably twice that, at elevated operating temperatures and in the other environmental conditions to which it will be exposed.

In various embodiments, the protective coating aids in pultrusion of the core during manufacturing and functions to protect the core from various factors including for example, environmental conditions and effects on the resin comprising the core.

BRIEF DESCRIPTION OF THE SEVERAL VIEWS OF THE DRAWINGS

These and other features of the invention are best understood by referring to the detailed description of the invention, read in light of the accompanying drawings, in which.

Figure 1:
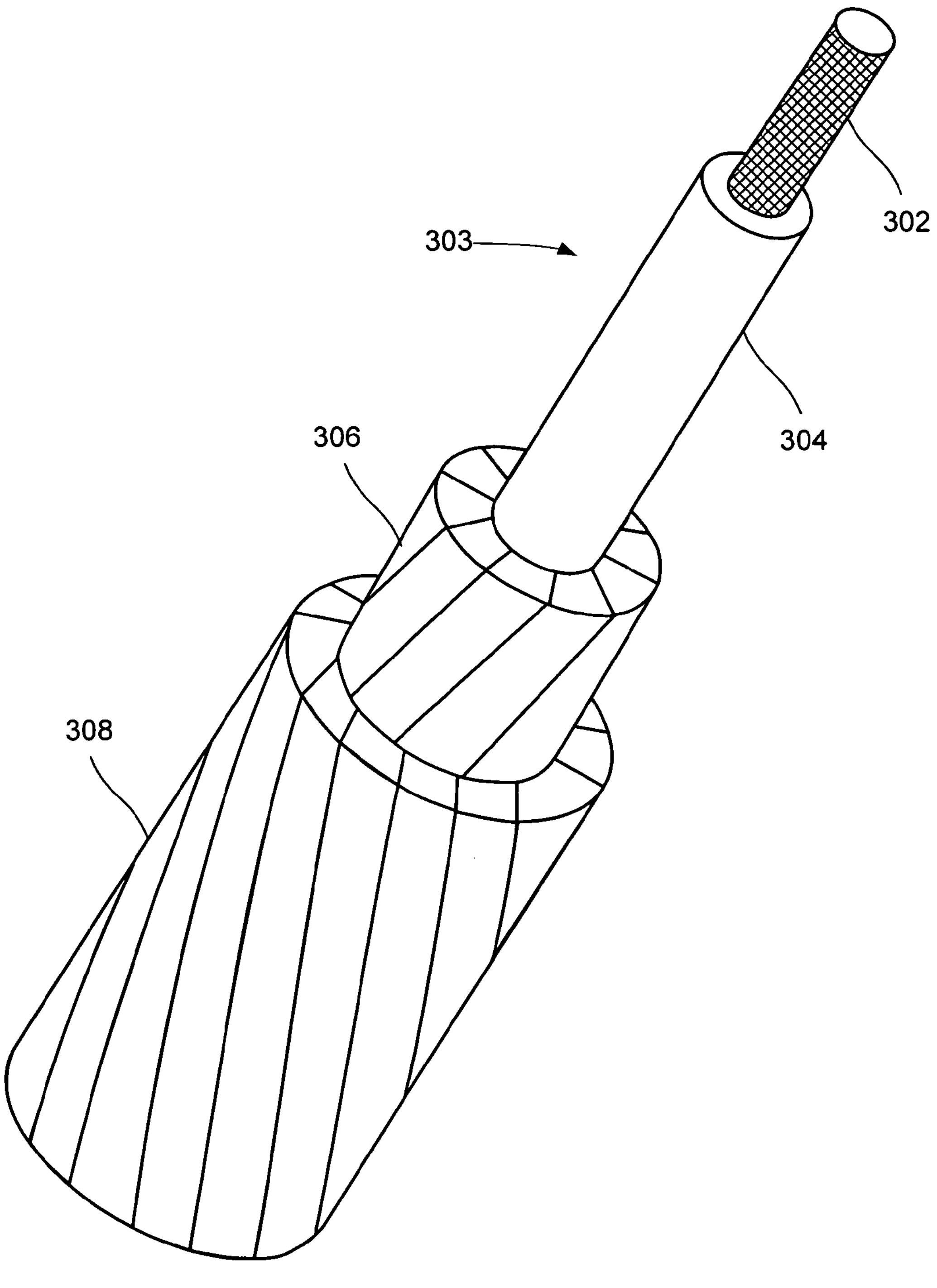
FIG. 1 is a schematic view of one embodiment of an aluminum conductor composite core (ACCC) reinforced cable showing an inner composite core and an outer composite core surrounded by two layers of aluminum conductor according to the invention.
Figure 3:
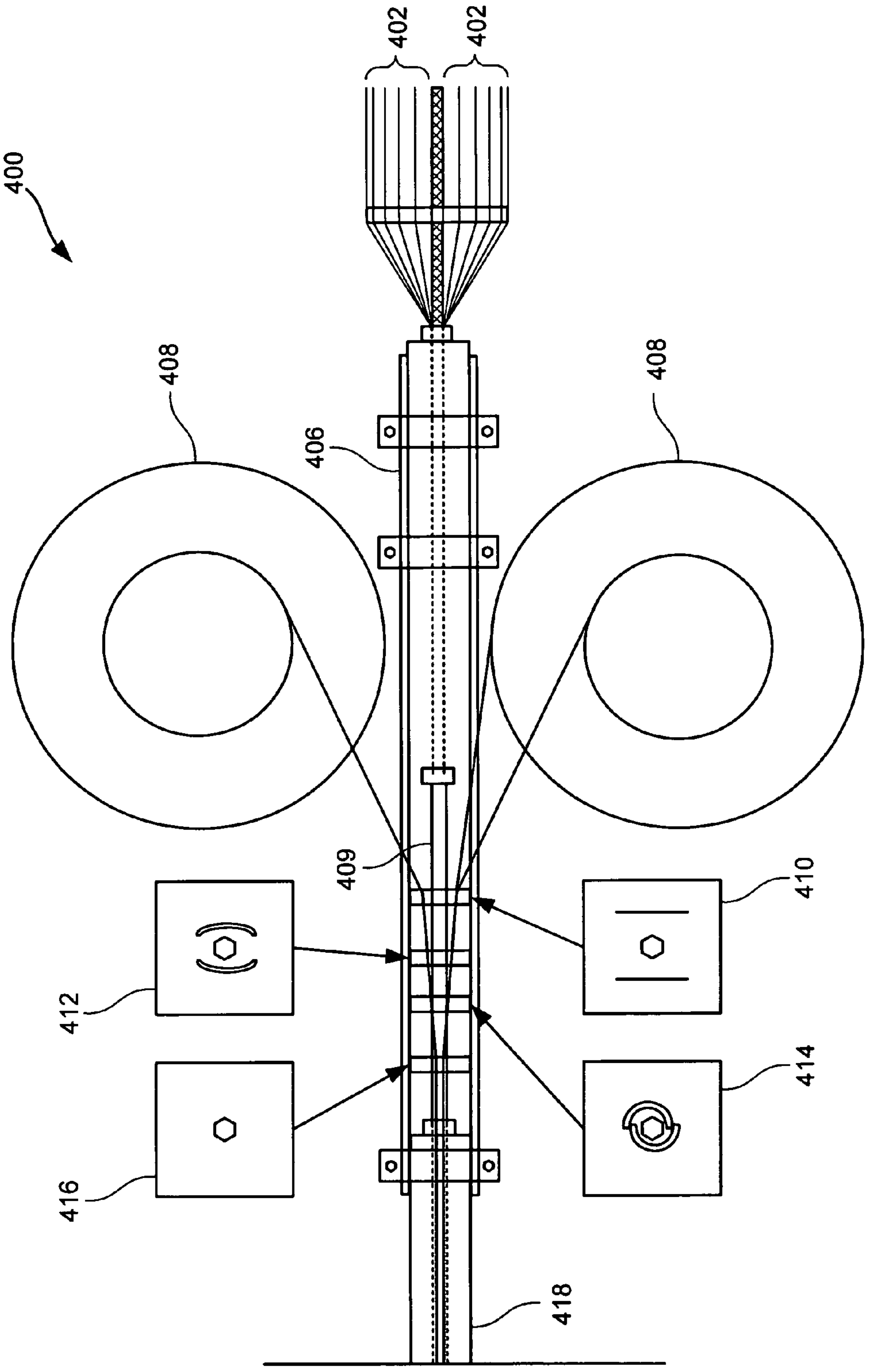
FIG. 3 shows a cross-sectional view of one embodiment of the method for processing a composite core according to the invention.

To clarify, each drawing includes reference numerals. These reference numerals follow a common nomenclature. The reference numeral will have three digits. The first digit represents the drawing number where the reference numeral was first used. For example, a reference numeral used first in drawing one will have a numeral like 1XX, while a numeral first used in drawing four will have a numeral like 4XX. The second two numbers represent a specific item within a drawing. One item in FIG. 1 may be 101 while another item may be 102. Like reference numerals used in later drawing represent the same item. For example, reference numeral 102 in FIG. 3 is the same item as shown in FIG. 1. In addition, the drawings are not necessarily drawn to scale but are configured to clearly illustrate the invention.

DETAILED DESCRIPTION OF THE INVENTION

The present invention will now be described more fully hereinafter with reference to the accompanying drawings, in which exemplary embodiments of the invention are shown. This invention may, however, be embodied in many different forms and should not be construed as limited to the embodiments set forth herein; rather, these embodiments are provided so that the disclosure will fully convey the scope of the invention to those skilled in the art.

An ACCC Reinforced Cable

The present invention relates to a reinforced composite core member, wherein said member further comprises an external surface coating. In one embodiment, the composite core comprises a composite material made from a plurality of fiber reinforcements from one or more fiber types embedded in a matrix. A further embodiment of the invention uses the composite core in an aluminum conductor composite core reinforced (ACCC) cable. These ACCC cables can provide for electrical power distribution wherein electrical power distribution includes distribution and transmission cables. FIG. 1 illustrates an embodiment of an ACCC reinforced cable 300. The embodiment in FIG. 1 illustrates an ACCC reinforced cable comprising a composite core 303 further comprising a carbon fiber reinforcement and epoxy resin composite inner core 302 and a glass fiber reinforcement and epoxy resin composite outer core 304, surrounded by a first layer of aluminum conductor 306. The conductor in this embodiment comprises a plurality of trapezoidal shaped aluminum strands helically surrounding the composite core. The first layer of aluminum is further surrounded by a second layer of trapezoidal shaped aluminum conductor 308.

Figure 1B:
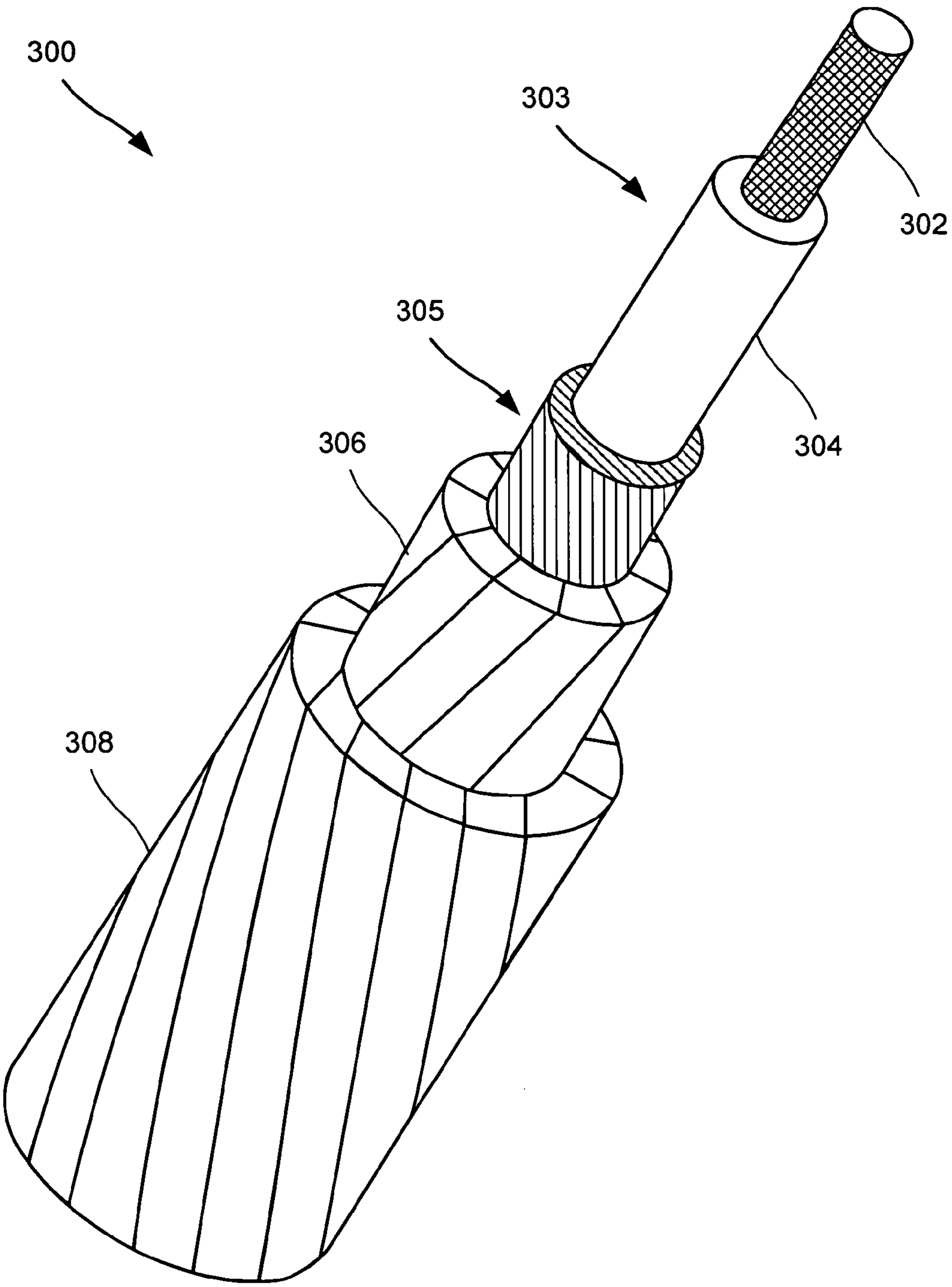
FIG. 1B is a schematic view of one embodiment of an aluminum conductor composite core (ACCC) reinforced cable showing an inner composite core and an outer composite core surrounded by an outer protective layer and two layers of aluminum conductor according to the invention.

A further embodiment of the invention illustrated in FIG. 1B shows an ACCC reinforced cable 300 comprising a composite core 303 further comprising a carbon fiber reinforcement and epoxy resin composite inner core 302 and a glass fiber reinforcement and epoxy resin composite outer core 304, surrounded by a protective coating or film 305. The protective coating will be discussed further below. The protective coating is further surrounded by a first layer of conductor 306. The first layer is further surrounded by a second layer of conductor 308.

A composite core of the invention can have a tensile strength above 200 Ksi, and more preferably within the range of about 200 Ksi to about 380 Ksi; a modulus of elasticity above 7 Msi, and more preferably within the range of about 7 Msi to about 37 Msi; an operating temperature capability above −45° C., and more preferably within the range of about −45° C. to about 240° C. or higher; and, a coefficient of thermal expansion below $1.0\times10^{-5}$/° C., and more preferably within the range of about $-0.6\times10^{-6}$ to about $1.0\times10^{-5}$/° C.

To achieve a composite core in the above stated ranges, different matrix materials and fiber types may be used. The matrix and the fiber properties are explained further below. First, matrix materials embed the fibers. In other words, the matrix bundles and holds the fibers together as a unit—a load member. The matrix assists the fibers to act as a single unit to withstand the physical forces on the ACCC cable. The matrix material may be any type of inorganic or organic material that can embed and bundle the fibers into a composite core. The matrix can include, but is not limited to, materials such as glue, ceramics, metal matrices, resins, epoxies, modified epoxies, foams, elastomers, epoxy phenolic blends, or other high performance polymers. One skilled in the art will recognize other materials that may be used as matrix materials.

While other materials may be used, an exemplary embodiment of the invention uses modified epoxy resins. Throughout the remainder of the invention the term resin or epoxy may be used to identify the matrix. However, the use of the terms epoxy and resin are not meant to limit the invention to those embodiments, but all other types of matrix material are included in the invention. The composite core of the present invention may comprise resins having physical properties that are adjustable to achieve the objects of the present invention. Further, resins according to the present invention comprise a plurality of components that may be adjusted and modified according to the invention.

The present invention may use any suitable resin. In addition, in various embodiments, resins are designed for ease of fabrication. In accordance with the invention, various resin viscosities may be optimized for high reactivity and faster production line speeds. In one embodiment, an epoxy anhydride system may be used. An important aspect of optimizing the resin system for the desired properties of the core as well as fabrication is selecting an optimal catalyst package. According to the invention, the catalyst (or "accelerator") should be optimized to generate the greatest amount of cure of the resin components in a short time with the least amount of side reaction that could cause cracking for instance. In addition, it is further desirable if the catalyst is inactive at low temperature for increased pot life and very active at high temperatures for the fastest pull times during fabrication.

In one embodiment, a vinyl ester resin may be specifically designed for high temperature cure processes. Another example is a liquid epoxy resin that is a reaction product of epichlorohydrin and bisphenol-A. Yet another example is a high purity bisphenol-A diglycidyl ether. Other examples would include polyetheramides, bismalimides, various anhydrides, or imides. In addition, curing agents may be chosen according to the desired properties of the end composite core member and the processing method. For example, curing agents may be aliphatic polyamines, polyamides and modified versions of these. Other suitable resins may include thermosetting resins, thermoplastic resins or thermoplastically modified resins, toughened resins, elastomerically modified resins, multifunctional resins, rubber modified resins, Cyanate Esters, or Polycyanate resins. Some thermosetting and thermoplastic resins may include, but are not limited to, phenolics, epoxies, polyesters, high-temperature polymers (polyimides), nylons, fluoropolymers, polyethelenes, vinyl esters, and the like. One skilled in the art will recognize other resins that may be used in the present invention.

Depending on the intended cable application, suitable resins are selected as a function of the desired cable properties to enable the composite core to have long term durability at high temperature operation. Suitable resins may also be selected according to the process for formation of the composite core to minimize friction during processing, to increase processing speed, and to achieve the appropriate fiber to resin ratio in the final composite core. In accordance with the invention, the resins may comprise a viscosity preferably in the range of about 50 to about 10,000 cPs and preferably in the range of about 500 to about 3,000 cPs and more preferably in the range of about 800 to about 1800 cPs.

The composite core of the present invention comprises resins having good mechanical properties and chemical resistance. These resins may be able to function with prolonged environmental exposure for at least 40 years of usage. More preferably, the composite core of the present invention can comprise resins having good mechanical properties and chemical, water and UV resistance at prolonged exposure for at least about 80 years of usage. Further, the composite core of the present invention comprises resins that may operate anywhere from −45° C. to 240° C., or higher, with minimal reduction of structural performance characteristics at the temperature extremes.

According to the present invention, resins may comprise a plurality of components in order to optimize the properties of the composite core and the fabrication process. In various embodiments, the resin comprises one or more hardener/accelerators to aid in the curing process. The accelerators chosen depend on the resin and the die temperature in the fabrication process. Further, the resin may comprise surfactants to aid in reducing surface tension in order to improve production line speeds and surface quality. The resin may further comprise clay or other fillers. Such ingredients add bulk to the resin and function to reduce costs while maintaining the physical properties of the resin. Additional additives may further be added. For example, UV resistant additives that make the resins resistant to UV, and coloring additives.

Generally, elongation properties of the resin system should exceed that of the glass, carbon, or other fibers being utilized. For example, an embodiment of an epoxy system may include a low viscosity multifunctional epoxy resin using an anhydride hardener and an imidazol accelerator. An example of this type of epoxy system may be the ARALDITE® MY 721/Hardener 99-023/Accelerator DY 070 hot curing epoxy matrix system by Huntsman Inc. and specified in the like titled data sheet dated September 2002. The resin has a chemical description of N,N,N',N'-Tetraglycidyl-4,4'-methylenebisbenzenamine. The hardener is described as 1H-Imidazole, 1-methyl-1-Methylimidazole. This exemplary resin epoxy system, modified specifically for the ACCC application can have the following properties: a tensile elongation around 3.0% to 5%; a flexural strength around 16.5 Ksi to 19.5 Ksi; a tensile strength around 6.0 Ksi to 7.0 Ksi; a tensile modulus around 450 Ksi to 500 Ksi; and a flexural elongation around 4.5% to 6.0%. Another embodiment of an epoxy resin system may be a multifunctional epoxy with a cycloaliphatic-amine blend hardener. An example of this type of epoxy system may be the JEFFCO 1401-16/4101-17 epoxy system for infusion by JEFFCO Products Inc. and specified in the like titled data sheet dated July 2002. This exemplary resin epoxy system can have the following properties: a Shore D Hardness around 88D; an ultimate tensile strength of 9.7 Ksi; an elongation at tensile strength around 4.5% to 5.0%; an ultimate elongation around 7.5% to 8.5%; a flexural strength around 15.25 Ksi; and an ultimate compressive strength around 14.5 Ksi. These embodiments of the epoxy resin system are exemplary and are not meant to limit the invention to these particular epoxy resin systems. One skilled in the art will recognize other epoxy systems that will produce composite cores within the scope of this invention.

The composite core of the present invention can comprise a resin that is tough enough to withstand splicing operations without allowing the composite body to crack. The composite core of the present invention may comprise resins having a neat resin fracture toughness at least about 0.96 $MPa \cdot m^{1/2}$.

The composite core of the present invention can comprise a resin having a low coefficient of thermal expansion. A low coefficient of thermal expansion reduces the amount of sag in the resulting cable. A resin of the present invention may have a coefficient of thermal expansion below about $4.2 \times 10^{-5}$/° C. and possibly lower than $1.5 \times 10^{-5}$/° C. The composite core of the present invention can comprise a resin having an elongation greater than about 3% or more preferably about 4.5%.

Second, the composite core comprises a plurality of fiber reinforcements from one or more fiber types. Fiber types may be selected from: carbon (graphite) fibers—both HM and HS (pitch based), KEVLAR fibers, basalt fibers, glass fibers, Aramid fibers, boron fibers, liquid crystal fibers, high performance polyethylene fibers, or carbon nanofibers, steel hardwire filaments, steel wires, steel fibers, high carbon steel cord with or without adhesion optimized coatings, or nanotubes. Several types of carbon, boron, KEVLAR and glass fibers are commercially available. Each fiber type may have subtypes that can be variously combined to achieve a composite with certain characteristics. For instance, carbon fibers may be any type from the ZOLTEK PANEX®, ZOLTEK PYRON®, HEXCEL, TORAY, or THORNEL families of products. These carbon fibers may come from a PAN Carbon Fiber or a Polyacrylonitrile (PAN) Precursor. Other carbon fibers would include, PAN-IM, PAN-HM, PAN-UHM, PITCH, or rayon byproducts, among others. There are dozens of different types of carbon fibers, and one skilled in the art would recognize the numerous carbon fibers that may be used in the present invention. There are also numerous different types of glass fibers. For instance, an A-Glass, B-Glass, C-Glass, D-Glass, B-Glass, S-Glass, AR-Glass, R-Glass, or basalt fibers may be used in the present invention. Fiberglass and paraglass may also be used. As with carbon fibers, there are dozens of different types of glass fibers, and one skilled in the art would recognize the numerous glass fibers that may be used in the present invention. It is noted that these are only examples of fibers that may meet the specified characteristics of the invention, such that the invention is not limited to these fibers only. Other fibers meeting the required physical characteristics of the invention may be used.

To achieve these physical characteristics, composite cores in accordance with the present invention may comprise only one type of fiber. The composite core may be a uniform section or layer that is formed from one fiber type and one matrix type. For instance, the composite core may be a carbon fiber embedded in resin. The core may also be a glass fiber embedded in a polymer, and the core may also be basalt embedded in a vinyl ester. However, most cables, within the scope of this invention, may comprise at least two distinct fiber types.

The two fiber types may be general fiber types, fiber classes, fiber type subtypes, or fiber type genera. For instance, the composite core may be formed using carbon and glass. Yet, when an embodiment mentions two or more fiber types, the fiber types need not be different classes of fibers, like carbon and glass. Rather, the two fiber types may be within one fiber class or fiber family. For instance, the core may be formed from E-glass and S-glass, which are two fiber types or fiber subtypes within the glass fiber family or fiber class. In another embodiment, the composite may comprise two types of carbon fibers. For instance, the composite may be formed from IM6 carbon fiber and IM7 carbon fiber. One skilled in the art will recognize other embodiments that would use two or more types of fibers.

The combination of two or more fiber types into the composite core member offers substantial improvements in strength to weight ratio over conventional materials, such as traditional steel non-composites, commonly used for cables in an electrical power transmission and distribution system. Combining fiber types also may allow the composite core to have sufficient stiffness and strength but maintain some flexibility.

Composite cores of the present invention may comprise fiber tows having relatively high yield or small K numbers. A fiber tow is a bundle of continuous microfibers, wherein the composition of the tow is indicated by its yield or K number. For example, a 12K carbon tow has 12,000 individual microfibers, and a 900 yield glass tow has 900 yards of length for every one pound of weight. Ideally, microfibers wet out with resin such that the resin coats the circumference of each microfiber within the bundle or tow. Wetting and infiltration of the fiber tows in composite materials is of critical importance to the performance of the resulting composite. Incomplete wetting results in flaws or dry spots within the fiber composite that reduce strength, durability and longevity of the composite product. Fiber tows may also be selected in accordance with the size of fiber tow that the process can handle.

Fiber tows of the present invention for carbon may be selected from 2K and up, but more preferably from about 4K to about 50K. Glass fiber tows may be 50 yield and up, but more preferably from about 115 yield to about 1200 yield.

For glass fibers, individual fiber size diameters in accordance with the present invention may be below 15 μm, or more preferably within the range of about 8 μm to about 15 μm, and most preferably about 10 μm in diameter. Carbon fiber diameters may be below 10 μm, or more preferably within the range of about 5 μm to about 10 μm, and most preferably about 7 μm. For other types of fibers, a suitable size range is determined in accordance with the desired physical properties. The ranges are selected based on optimal wet-out characteristics and feasibility of use.

A relative amount of each type of fiber can vary depending on the desired physical characteristics of the composite core. For example, fibers having a higher modulus of elasticity enable formation of a high strength and high-stiffness composite core. As an example, carbon fibers have a modulus of elasticity from 15 Msi and up, but more preferably, from about 22 Msi to about 45 Msi; glass fibers are considered low modulus fibers having a modulus of elasticity of about 6 to about 15 Msi, and more preferably in the range of about 9 to about 15 Msi. As one skilled in the art will recognize, other fibers may be chosen that can achieve the desired physical properties for the composite core. In one example, a composite core may comprise a substantial portion of inner advanced composite surrounded by a substantially smaller outer layer of low modulus glass fiber. By varying the particular combinations and ratios of fiber types, pre-tensioning of the finished core may also be achieved to provide a compound improvement in the core's ultimate strength. Carbon Fiber, for instance, which has a very low coefficient of thermal expansion and relatively low elongation can be combined with e-glass (as an example) which has a higher coefficient of thermal expansion and greater elongation. By varying the resin chemistry and processing temperatures, the resulting "cured" product can be "tuned" to provide greater strength than the sum of the individual strengths of each fiber type. At higher processing temperatures, the glass fibers expand while the carbon fibers basically don't. In the controlled geometry of a processing die, the outcome is that, as the product exits the die and begins to cool down to ambient temperature, the glass, in its attempt to return to its original length begins to compress the carbon fibers while still maintaining some pre tension, based on the ratio of the fiber blend and the resin's physical characteristics. The resulting product has a measurably improved tensile and flexural strength characteristic.

Composite cores of the present invention can comprise fibers having relatively high tensile strengths. The degree of initial installed sag in an overhead voltage power transmission cable varies as the square of the span length and inversely with the tensile strength of the cable. An increase in the tensile strength can effectively reduce sag in an ACCC cable. As an example, carbon or graphite fibers may be selected having a tensile strength of at least 250 Ksi and more preferably within the range of about 350 Ksi to about 1000 Ksi, but most preferably, within the range between 710

Ksi to 750 Ksi. Also as an example, glass fibers can be selected having a tensile strength at least about 180 Ksi, and more preferably within the range of about 180 Ksi to about 800 Ksi. The tensile strength of the composite core can be adjusted by combining glass fibers having a lower tensile strength with carbon fibers having a higher tensile strength. The properties of both types of fibers may be combined to form a new cable having a more desirable set of physical characteristics.

Composite cores of the present invention can have various fiber to resin volume fractions. The volume fraction is the area of fiber divided by the total area of the cross section. A composite core of the present invention may comprise fibers embedded in a resin having at least a 50% volume fraction and preferably at least 60%. The fiber to resin ratio affects the physical properties of the composite core member. In particular, the tensile strength, flexural strength, and coefficient of thermal expansion are functions of the fiber to resin volume. Generally, a higher volume fraction of fibers in the composite results in higher performing composite. The weight of the fiber and resin matrix will determine the ratio of fiber to resin by weight.

Any layer or section of the composite core may have a different fiber to resin ratio by weight relative to the other layers or sections. These differences may be accomplished by selecting and choosing an appropriate number of fibers for the appropriate resin type to achieve the desired fiber to resin ratio. For example, a composite core member having a ⅜" diameter cross-section, consisting of a carbon fiber and epoxy layer surrounded by an outer glass and epoxy layer may comprise 28 spools of 250 yield glass fiber and an epoxy resin having a viscosity of about 1000 cPs to about 2000 cPs at 50° C. This fiber to resin selection can yield a fiber to resin ratio of about 65/45 by weight. Preferably, the resin may be modified to achieve the desired viscosity for the forming process. The exemplary composite may also have 28 spools of 24K carbon fiber and an epoxy resin having a viscosity of about 1000 cPs to about 2000 cPs at 50° C. This selection can yield a fiber to resin ratio of about 65/35 by weight. Changing the number of spools of fiber changes the fiber to resin by weight ratio, and thereby can change the physical characteristics of the composite core. Alternatively, the resin may be adjusted to increase or decrease the resin viscosity to improve the resin impregnation of the fibers In various embodiments, the composite core may comprise any one of a plurality of geometries. Some of the different embodiments of the various geometries will be explained below. In addition, the composite core may further comprise fibers having various alignments or orientations. Continuous towing can longitudinally orient the fibers along the cable. The core may have a longitudinal axis running along the length of the cable. In the art, this longitudinal axis is referred to as the 0° orientation. In most cores, the longitudinal axis runs along the center of the core. Fibers can be arranged to be parallel with this longitudinal axis; this orientation is often referred to as a 0° orientation or unidirectional orientation. However, other orientations may be integrated for various optimization purposes, to address such variables as flexural strength, for instance.

The fibers in the composite core may be arranged in various ways within the core. Besides the 0° orientation, the fibers may have other arrangements. Some of the embodiments may include off-axis geometries. One embodiment of the composite core may have the fibers helically wound about the longitudinal axis of the composite core. The winding of the fibers may be at any angle from near 0° to near 90° from the 0° orientation. The winding may be in the + and – direction or in the + or – direction. In other words, the fibers may be wound in a clockwise or counterclockwise direction. In an exemplary embodiment, the fibers would be helically wound around the longitudinal axis at an angle to the longitudinal axis. In some embodiments, the core may not be formed in radial layers. Rather, the core may have two or more flat layers that are compacted together into a core. In this configuration, the fibers may have other fiber orientation besides 0° orientation. The fibers may be laid at an angle to the 0° orientation in any layer. Again, the angle may be any angle + or – from near 0° to near 90°. In some embodiments, one fiber or group of fibers may have one direction while another fiber or group of fibers may have a second direction. Thus, the present invention includes all multidirectional geometries. One skilled in the art will recognize other possible angular orientations.

In various embodiments, the fibers may be interlaced or braided. For example, one set of fibers may be helically wound in one direction while a second set of fibers is wound in the opposite direction. As the fibers are wound, one set of fibers may change position with the other set of fibers. In other words, the fibers would be woven or crisscrossed. These sets of helically wound fibers also may not be braided or interlaced but may form concentric layers in the core. In another embodiment, a braided sleeve may be placed over the core and embedded in the final core configuration. Also, the fibers may be twisted upon themselves or in groups of fibers. One skilled in the art will recognize other embodiments where the fiber orientation is different. Those different embodiments are included within the scope of the invention.

Other geometries are possible beyond the orientation of the fibers. The composite core may be formed in different layers and sections. In one embodiment, the composite core comprises two or more layers. For example, a first layer may have a first fiber type and a first type of matrix. Subsequent layers may comprise different fiber types and different matrices than the first layer. The different layers may be bundled and compacted into a final composite core. As an example, the composite core may consist of a layer made from carbon and epoxy, a glass fiber and epoxy layer, and then a basalt fiber and epoxy layer. In another example, the core may comprise four layers; an inner layer of basalt, a next layer of carbon, a next layer of glass and an outer layer of basalt. All of these different arrangements can produce different physical properties for the composite core. One skilled in the art will recognized the numerous other layer configurations that are possible.

Figure 2:
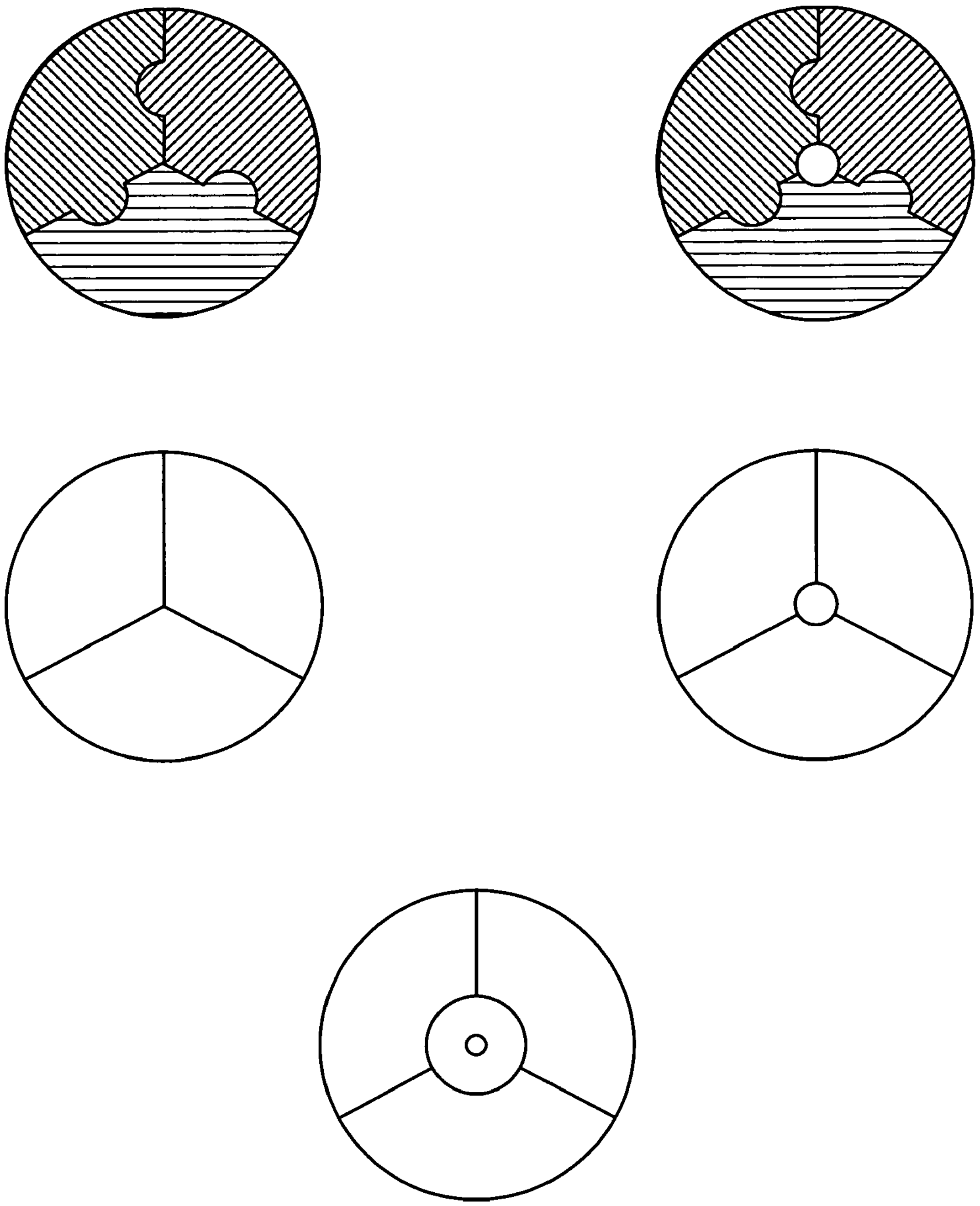
FIG. 2 shows a cross-sectional view of five possible composite core cross-section geometries according to the invention.

Still another core arrangement may include different sections in the core instead of layers. FIG. 2 shows five possible alternate embodiments of the composite core. These cross sections demonstrate that the composite core may be arranged in two or more sections without those sections being layered. Thus, depending on the physical characteristics desired, the composite core can have a first section of core with a certain composite and one or more other sections with a different composite. These sections can each be made from a plurality of fibers from one or more fiber types embedded in one or more types of matrices. The different sections may be bundled and compacted into a final core configuration.

In various embodiments, the layers or sections may comprise different fibers or different matrices. For example, one section of the core may be a carbon fiber embedded in a thermosetting resin. Another section may be a glass fiber embedded in a thermoplastic section. Each of the sections may be uniform in matrix and fiber type. However, the sections and layers may also be hybridized. In other words, any section or layer may be formed from two or more fiber types. Thus, the section or layer may be, as an example, a composite made from glass fiber and carbon fiber embedded in a resin. Thus, the composite cores of the present invention can form a composite core with only one fiber type and one matrix, a composite core with only one layer or section with two or more fiber types and one or more matrices, or a composite core formed from two or more layers or sections each with one or more fiber types and one or more matrix types. One skilled in the art will recognize the other possibilities for the geometry of the composite core.

The physical characteristics of the composite core may also be adjusted by adjusting the area percentage of each component within the composite core member. For example, by reducing the total area of carbon in the composite core mentioned earlier from 0.0634 sq. in. and increasing the area of the glass layer from 0.0469 sq. in., the composite core member product may reduce stiffness and increase flexibility.

Advanced composite fibers may be selected from the group having the following characteristics: a tensile strength at least about 250 Ksi and preferably in the range of about 350 Ksi to about 1000 Ksi; a modulus of elasticity at least 15 Msi and preferably within the range of about 22 Msi to about 45 Msi; a coefficient of thermal expansion at least within the range of about $-0.6\times10^{-6}$/° C. to about $1.0\times10^{-5}$/° C.; a yield elongation percent within the range of about 2% to 4%; a dielectric within the range of about 0.31 W/m·K to about 0.04 W/m·K; and a density within the range of about 0.065 lb/in$^3$ to about 0.13 lb/in$^3$.

Low modulus fibers may be selected from the group having the following characteristics: tensile strength within the range about 180 Ksi to 800 Ksi; a modulus of elasticity of about 6 to about 15, more preferably about 9 to about 15 Msi; a coefficient of thermal expansion within the range of about $5\times10^{-6}$/° C. to about $10\times10^{-6}$/° C.; a yield elongation percent within the range of about 3% to about 6%; a dielectric within the range of about 0.034 W/m·K to about 0.04 W/m·K; and a density from 0.060 lbs/in$^3$ and up, but more preferably from about 0.065 lbs/in$^3$ to about 0.13 lbs/in$^3$.

In one embodiment a composite core may comprise interspersed high modulus of elasticity fibers and low modulus of elasticity fibers. Depending on the strain to failure ratio, this type of core may be a single section or layer of hybridized composite or it may be formed in several sections of single fiber composite.

In accordance with the present invention, the resins comprising the composite matrix can be customized to achieve certain properties for processing and to achieve desired physical properties in the end product. As such, the fiber and customized resin strain to failure ratio can be determined.

The composite core may also include other surface applications or surface treatments to the composite core or film around the composite core. Referring to FIG. 1B for example, a film 305 or coating surrounds the composite core 303. The film may include any chemical or material application to the core that protects the core 303 from environmental factors, protects the core 303 from wear, or prepares the core 303 for further processing. Some of these types of treatments may include, but are not limited to, gel coats, protective paintings, or other post or pre-applied finishes, or films such as Kapton, Teflon, Tefzel, Tedlar, Mylar, Melonex, Tednex, PET, PEN, or others.

According to the invention, a protective film provides at least two effects. First, the film adheres to the core to protect the core from environmental factors, thereby potentially increasing longevity. Second, the film lubricates the outside of the core that is in contact with the die to ease fabrication and increase processing speeds. In various embodiments this material would prevent the often adhesive-like resin matrix from contacting the inner surface of the die, thereby enabling dramatically improved processing speeds. The effect, essentially, is that the film creates a static processing environment within one that is actually dynamic. In various embodiments, the film may be a monofilm or a multiple layer film wherein, the multiple layers comprises multiple dimensions and/or physical characteristics. For example, the physical properties of the inside layer may be compatible in terms of bonding to the core 303, while the outer layer(s) may simply be utilized as a non-compatible processing aid.

Some of the material applications may include, but are not limited to, surface veils applied to the core, mats applied to the core, or protective or conductive tapes wrapped around the core. The tape may include dry or wet tapes. The tapes may include, but are not limited to, paper or paper-product tapes, metallic tape (like aluminum tape), polymeric tapes, rubber tapes, or the like. Any of these products may protect the core from environmental forces like moisture, heat, cold, UV radiation, or corrosive elements. Some examples of films may include Kapton, Tefzel (a blend of Teflon and Kapton), VB-3, Teflon, PEN and PET (mylar, polyester, etc.). Other applications and treatments to the core will be recognized by one skilled in the art and are included in the present invention.

Another problem occurs in some steel reinforced or metal reinforced cables. Steel reinforced cables require a measure of sag in the cable between consecutive towers or pole structures. The sag in the line allows vibration or sway in the cable, and, in some situations, the sag may be subjected to harmonic vibration, Aeolian (wind-induced) vibration, or excessive swaying in the cable. At certain wind speeds or due to environmental forces, the cable may vibrate at a harmonic frequency or at such force that the cable or the support structures wear or weaken due to stress and strain. Some environmental forces that could cause damaging vibrations may include, but are not limited to wind, rain, earthquakes, tidal action, wave action, river flow action, nearby automobile traffic, nearby watercraft, or nearby aircraft. One skilled in the art will recognize other forces that may cause damaging vibrations. In addition, one skilled in the art will recognize that harmonic or damaging vibration is a function of the material in the cable, the sag, the length of the span, and the force inducing the vibration.

One particular problem occurs with cable spans across or near railroad tracks. The movement of trains along the railroad tracks and the vibration from powerful diesel engines causes vibrations in the railroad tracks and in the ground around the tracks. The ground vibrations induce vibrations in electrical poles and support structures that hold the electrical cables. The cables in turn vibrate due to the vibrating support structures. In some cases, the vibrations in the cables occur at harmonics that cause violent or damaging vibration and sway. This harmonic or damaging vibration causes stresses in the cable and the support structures. Sag in the ACSR or like cables amplifies the effects of the vibrations. In some instances, the sag allows harmonic vibrations from the trains. The ACCC cable in proximity to the train tracks is not affected by the same vibration effects. Rather, the ACCC cable that runs parallel or near the tracks or that crosses over the tracks can have less line sag. The reduced line sag or the different properties of the composite core reduce, dampen, or lessen the effects of the train caused vibrations.

The present invention helps prevent the harmonic or damaging sway or vibration in electrical cables due to wind or other forces, such as passing trains. First, the ACCC cable may be installed differently due to its increased strength to weight characteristics. The ACCC cable may span distances with less sag. The ACCC cables can be made lighter and stiffer than steel reinforced cables due to the improved properties of the inner core explained above. Thus, the problematic frequencies may be different for an ACCC cable compared to the steel reinforced cable. The sag amount may be changed to adjust the frequencies in the cable that can cause damaging vibration or sway. The cable sag may be lessened to alter the harmonic or damaging frequencies that may be induced in the cable. In addition, cable spans may be changed. Due to the increased strength of some ACCC cables, the distance between poles may be changed to adjust the damaging frequencies. One skilled in the art will recognize other installation possibilities the ACCC cables provide that can help reduce or eliminate vibration or sway, especially harmonic or damaging vibration.

Second, the materials used in the composite core may be adjusted to dampen vibrations within the cable. For instance, an elastomer or other material may be used in a layer, in a section, or as part of the matrix-material of the composite core. The presence of the elastomer or other material may function as a dampening component that absorbs the vibrations or dissipates the vibrations. In addition, the fiber types may be adjusted to dampen vibrations. For instance, a more elastic fiber type, such as a polymer fiber, may be used to absorb or dissipate the vibrations. Thus, the composition of the composite core may prevent or mitigate vibration forces. One skilled in the art will recognize other changes to the composite core that may reduce or eliminate vibration or sway, especially harmonic or damaging vibration.

Thirdly, the geometry of the core, as a single or multiple profile can serve to provide self-dampening characteristics as its smooth surfaces interact between themselves and/or the aluminum conductor strands. This interaction "absorbs" vibration across a wide array of frequencies and amplitudes which can be further adjusted by varying the core component's geometries and/or the installation tension of the ACCC cable.

The composite cables made in accordance with the present invention exhibit physical properties wherein these certain physical properties may be controlled by changing parameters during the composite core forming process. More specifically, the composite core forming process is adjustable to achieve desired physical characteristics in a final ACCC cable.

A Method of Manufacture of a Composite Core for an ACCC Reinforced Cable:

Several forming processes to create the composite core may exist, but an exemplary process is described hereinafter. This exemplary process is a high-speed manufacturing process for composite cores. Many of the processes, including the exemplary process, can be used to form the several different composite cores with the several different core structures mentioned or described earlier. However, the description that follows chooses to describe the high-speed processing in terms of creating a carbon fiber core with a glass fiber outer layer, having unidirectional fibers, and a uniformly layered, concentric composite core. The invention is not meant to be limited to that one embodiment, but encompasses all the modifications needed to use the high-speed process to form the composite cores mentioned earlier. These modifications will be recognized by one skilled in the art.

In accordance with the invention, a multi-phase forming process produces a composite core member from substantially continuous lengths of suitable fiber tows and heat processible resins. After producing an appropriate core, the composite core member can be wrapped with high conductivity material.

A process for making composite cores for ACCC cables according to the invention is described as follows. Referring to FIG. 3, the conductor core forming process of the present invention is shown and designated generally by reference number 400. The forming process 400 is employed to make continuous lengths of composite core members from suitable fiber tows or rovings and resins. The resulting composite core member comprises a hybridized concentric core having an inner and outer layer of uniformly distributed substantially parallel fibers.

The beginning of the operation will only be described briefly as it is discussed in detail in CIP U.S. Ser. No. 10/691,447, pending and CIP U.S. Ser. No. 10/692,304, now U.S. Pat. No. 7,060,326, and PCT/US03/12520, each of which are incorporated by reference herein. In starting the operation, the pulling and winding spool mechanism is activated to commence pulling. In one embodiment, unimpregnated initial fiber tows, comprising a plurality of fibers extending from the exit end of the process serve as leaders at the beginning of the operation to pull fiber tows 402 (and 401) from spools (not shown) through a fiber tow guide and the composite core processing system 400. Fiber tows 402, as shown, comprise a center portion of carbon fibers 401 surrounded by outer fiber tows of glass fiber 402.

Referring to FIG. 3, multiple spools of fiber tows 401 and 402 are contained within a dispensing rack system and are threaded through a fiber tow guide (not shown). The fibers can be unwound and depending on the desired characteristics of the core, the fibers may be kept parallel or the fibers may be twisted during the process. Preferably, a puller (not shown) at the end of the apparatus pulls the fibers through the apparatus. Each dispensing rack can comprise a device allowing for the adjustment of tension for each spool. For example, each rack may have a small brake at the dispensing rack to individually adjust the tension for each spool. Tension adjustment minimizes caternary and cross-over of the fiber when it travels and aids in the wetting process. In one embodiment, the tows 401/402 may be pulled through the guide (not shown) and into a preheating oven that evacuates moisture. Preferably, the preheating oven uses continuous circular air flow and a heating element to keep the temperature constant. The preheating oven is preferably above 100° C.

The tows 401/402 in one embodiment are pulled into a wet out system. The wet out system may be any process or device that can wet the fibers or impregnate the fibers with resin. Wet out systems may include incorporating the resin in a solid form that will be liquefied during later heating. For instance, a thermoplastic resin may be formed as several fibers. These fibers may be interspersed with the carbon and glass fibers of the exemplary embodiment. When heat is applied to the bundle of fibers, the thermoplastic fibers liquefy or melt and impregnate or wet the carbon and glass fibers.

In another embodiment, the carbon and glass fibers may have a bark or skin surrounding the fiber; the bark holds or contains a thermoplastic or other type resin in a powder form. When heat is applied to the fibers, the bark melts or evaporates, the powdered resin melts, and the melted resin wets the fibers. In another embodiment, the resin is a film applied to the fibers and then melted to wet the fibers. In still another embodiment, the fibers are already impregnated with a resin—these fibers are known in the art as pre-preg tows. If the pre-preg tows are used, no wet out tank or device is used. An embodiment of the wet out system is a wet out tank. Hereinafter, a wet out tank will be used in the description, but the present invention is not meant to be limited to that embodiment. Rather, the wet out system may be any device to wet the fibers. The wet out tank is filled with resin to impregnate the fiber tows 401/402. Excess resin is removed from the fiber tows 401/402 during wet out tank exit, and finally as the materials are pulled into the initial curing die.

Various alternative techniques well known in the art can be employed to apply or impregnate the fibers with resin. Such techniques include for example, spraying, dipping, reverse coating, brushing, and resin injection. In an alternate embodiment, ultrasonic activation uses vibrations to improve the wetting ability of the fibers. In another embodiment, a dip tank may be used to wet out the fibers. A dip tank has the fibers drop into a tank filled with resin. When the fibers emerge from the tank filled with resin, the fibers are wetted. Still another embodiment may include an injection die assembly. In this embodiment, the fibers enter a pressurized tank filled with resin. The pressure within the tank helps wet the fibers. The fibers can enter the die for forming the composite while still within the pressurized tank. One skilled in the art will recognize other types of tanks and wet out systems that may be used.

Generally, any of the various known resin compositions can be used with the invention. In an exemplary embodiment, a heat curable thermosetting polymeric may be used. The resin may be for example, PEAR (PolyEther Amide Resin), Bismaleimide, Polyimide, liquid-crystal polymer (LCP), vinyl ester, high temperature epoxy based on liquid crystal technology, or similar resin materials. One skilled in the art will recognize other resins that may be used in the present invention. Resins are selected based on the process and the physical characteristics desired in the composite core.

Further, the viscosity of the resin affects the rate of formation. To achieve the desired proportion of fiber to resin for formation of the composite core member, preferably, the viscosity range of the resin is within the range of about 50 Centipoise to about 3000 Centipoise at 20° C. More preferably, the viscosity falls in the range of about 800 Centipoise to about 1200 Centipoise at 20° C. A preferred polymer provides resistance to a broad spectrum of aggressive chemicals and has very stable dielectric and insulating properties. It is further preferable that the polymer meets ASTME595 outgassing requirements and UL94 flammability tests and is capable of operating intermittently at temperatures ranging between 180° C. and 240° C. or higher without thermally or mechanically damaging the strength of the member.

To achieve the desired fiber to resin wetting ratio, the upstream side of the wet out tank can comprise a device to extract excess resin from the fibers. In one embodiment, a set of wipers may be placed after the end of the wet out system, preferably made from steel chrome plated wiping bars. The wipers can be "doctor blades" or other device for removing excess resin.

During the wet out process each bundle of fiber contains as much as three times the desired resin for the final product. To achieve the right proportion of fiber and resin in the cross section of the composite core members, the amount of pure fiber is calculated. A die or series of dies or wipers are designed to remove excess resin and control the fiber to resin ratio by volume. Alternatively, the die and wipers can be designed to allow passage of any ratio of fiber to resin by volume. In another embodiment, the device may be a set of bars or squeeze out bushings that extract the resin. These resin extraction devices may also be used with other wet out systems. In addition, one skilled in the art will recognize other devices that may be used to extract excess resin. Preferably, the excess resin is collected and recycled into the wet out tank.

Preferably, a recycle tray extends lengthwise under the wet out tank to catch overflow resin. More preferably, the wet out tank has an auxiliary tank with overflow capability. Overflow resin is returned to the auxiliary tank by gravity through the piping. Alternatively, tank overflow can be captured by an overflow channel and returned to the tank by gravity. In a further alternate, the process can use a drain pump system to recycle the resin back from the auxiliary tank and into the wet out tank. Preferably, a computer system controls the level of resin within the tank. Sensors detect low resin levels and activate a pump to pump resin into the tank from the auxiliary mixing tank into the processing tank. More preferably, there is a mixing tank located within the area of the wet out tank. The resin is mixed in the mixing tank and pumped into the resin wet out tank.

Fiber tows 401/402 are pulled into a die 406 to compact and configure the tows 401 and 402. One or more dies may be used to compact, to drive air out of the composite, and to shape the fibers into a composite core. In an exemplary embodiment, the composite core is made from two sets of fiber tows—inner segments are formed from carbon while outer segments are formed from glass. The first die 406 functions further to remove excess resin from the fiber resin matrix and may begin catalyzation (or "B-Staging") of the resin. The length of the die is a function of the desired characteristics of the fiber and resin. In accordance with the invention, the length of the die 406 may range from about ½ inch to about 6 feet. Preferably, the die 406 ranges from about 3 inches to 36 inches in length depending on the desired line speed. The die 406 further comprises a heating element to enable variation of the temperature of the die 406. For example, in various resin systems it is desirable to have one or more heating zones within the die to active various hardeners or accelerators.

The resins used in accordance with the invention may allow the process to achieve speeds up to or above 60 ft/min. In one embodiment of the invention, the core is pulled from the first die 406 and wrapped with a protective tape, coating or film. Although tape, coating and film may be used to describe different embodiments, the term film is used herein to simplify the description and is not meant to be limiting.

In FIG. 3 two large rolls of tape 408 introduce tape into a first carding plate 410. The carding plate 410 aligns the tape parallel to each other surrounding the core. The core 409 is pulled to a second carding plate 412. The carding plate 412 function is to progressively fold the tape towards the center core 409. The core 409 is pulled through a third carding plate 414. Carding plate 414 functions to fold the tape towards the center core 409. Referring again to FIG. 3, the core 409 is pulled through a fourth carding plate 416 which functions to further wrap the tape around the core 409. Although this exemplary embodiment comprises four carding plates, the invention may encompass any plurality of plates to encompass the wrapping. The area between each die can also be temperature controlled to assist with resin catalyzation and processing.

In an alternate embodiment, the tape is replaced by a coating mechanism. Such mechanism functions to coat the core 409 with a protective coating. In various embodiments, the coating may be sprayed on or rolled on by an apparatus adjusted to apply the coating from any plurality of angles in relation to the composite core. For example, Gelcoat may be applied like a paint using a reverse coating. It is preferable that the coating has a fast cure time so it is dry by the time the core and coating reach the winding wheel at the end of the process.

Once the core 409 is wrapped with tape, the core 409 is pulled through a second die 418. The second die 418 functions to further compress and shape the core 409. The compaction of all the fiber tows 401/402 creates a uniformly distributed, layered, and concentric final composite core with the requisite outside diameter. The second die also enables the catalyzation process to be completed Alternatively, the composite core 409 can pulled through a second B-stage oven to a next oven processing system wherein the composite core member is cured. The process determines the curing heat. The curing heat remains constant throughout the curing process. In the present invention, the preferred temperature for curing ranges from about 350 F to about 500 F. The curing process preferably spans within the range of about 3 feet to about 60 feet. More preferably, the curing process spans within the range of about 10 feet in length.

After curing, the composite core is pulled through a cooling phase . Preferably, the composite core member cools for a distance ranging from about 8 feet to about 15 feet by air convection before reaching the puller at the end of the process. Alternatively, the core may be pulled to a next oven processing system for post curing at elevated temperature. The post-curing process promotes increased cross-linking within the resin resulting in improved physical characteristics of the composite member. The process generally can allow an interval between the heating and cooling process and a pulling apparatus at the end of the process to cool the product naturally or by convection such that the pulling device used to grip and pull the product will not damage the product. The pulling apparatus pulls the product through the process with precision controlled speed.

After the core 409 is pulled through the process, the core may be wound using a winding system whereby the fiber core is wrapped around a wheel for storage or transportation. It is critical to the strength of the core member that the winding does not over stress the core by bending. In one embodiment, the core does not have any twist, but the fibers are unidirectional. A standard winding wheel has a diameter of 3.0 feet with the ability to store up to 100,000 feet of core material. The wheel is designed to accommodate the stiffness of the composite core member without forcing the core member into a configuration that is too tight. The winding wheel must also meet the requirements for transportation. Thus, the wheel must be sized to fit under bridges and be carried on semi-trailer beds or train beds. In a further embodiment, the winding system comprises a means for preventing the wheel from reversing flow from winding to unwinding. The means can be any device that prevents the wheel direction from reversing for example, a clutch or a brake system.

In a further embodiment, the process includes a quality control system comprising a line inspection system. The quality control process assures consistent product. The quality control system may include ultrasonic inspection of composite core members; record the number of tows in the end product; monitor the quality of the resin; monitor the temperature of the ovens and of the product during various phases; measure formation; or measure speed of the pulling process. For example, each batch of composite core member has supporting data to keep the process performing optimally. Alternatively, the quality control system may also comprise a marking system. The marking system may include a system, such as a unique embedded fiber, to mark the composite core members with the product information of the particular lot. Further, the composite core members may be placed in different classes in accordance with specific qualities, for example, Class A, Class B and Class C.

The fibers used to process the composite core members can be interchanged to meet specifications required by the final composite core member product. For example, the process allows replacement of fibers in a composite core member having a carbon core and a glass fiber outer core with high grade carbon and glass. The process allows the use of more expensive better performing fibers in place of less expensive fibers due to the combination of fibers and the small core size required. In one embodiment, the combination of fibers creates a high strength inner core with minimal conductivity surrounded by a low modulus nonconductive outer insulating layer. In another embodiment, the outer insulating layer contributes to the flexibility of the composite core member and enables the core member to be wound, stored and transported on a transportation wheel. The outer non-ferrous core material will also mitigate the type of electrolysis commonly found between a conventional metal core and the dissimilar conductor wire (typically an aluminum alloy).

Changing the composite core design may affect the stiffness and strength of the inner core. As an advantage, the core geometry may be designed to achieve optimal physical characteristics desired in a final ACCC cable. Another embodiment of the invention, allows for redesign of the composite core cross section to accommodate varying physical properties and increase the flexibility of the composite core member. Referring again to FIG. 2, the different composite shapes change the flexibility of the composite core member. The configuration of the fiber type and matrix material may also alter the flexibility. The present invention includes composite cores that can be wound on a winding wheel. The winding wheel or transportation wheel may be a commercially available winding wheel or winding drum. These wheels are typically formed of wood or metal with an inside diameter of 30 to 48 inches.

Stiffer cores may require a larger wheel diameter which are not commercially viable. In addition, a larger winding wheel may not meet the transportation standards to pass under bridges or fit on semi-trailers. Thus, stiff cores are not practical. To increase the flexibility of the composite core, the core may be twisted or segmented to achieve a wrapping diameter that is acceptable. In one embodiment, the core may include one 360 degree twist of the fiber for every one revolution of core around the wheel to prevent cracking. Twisted fiber is included within the scope of this invention and includes fibers that are twisted individually or fibers that are twisted as a group. In other words, the fibers may be twisted as a roving, bundle, or some portion of the fibers. Alternatively, the core can be a combination of twisted and straight fiber. The twist may be determined by the wheel diameter limit. The tension and compaction stresses on the fibers are balanced by the single twist per revolution.

Winding stress is reduced by producing a segmented core. FIG. 2 illustrates some examples of embodiments of the core other than the embodiment of the core shown in FIG. 1, namely, an inner concentric core surrounded by an outer concentric core. The segmented core under the process is formed by curing the section as separate pieces wherein the separate pieces are then grouped together. Segmenting the core enables a composite member product having a core greater than 0.375 inches to achieve a desirable winding diameter without additional stress on the member product.

Variable geometry of the cross sections in the composite core members may be processed as a multiple stream. The processing system is designed to accommodate formation of each segment in parallel. Preferably, each segment is formed by exchanging the series of consecutive bushings or dies for bushings or dies having predetermined configurations for each of the passageways. In particular, the size of the passageways may be varied to accommodate more or less fiber, the arrangement of passageways may be varied in order to allow combining of the fibers in a different configuration in the end product and further bushings may be added within the plurality of consecutive bushings or dies to facilitate formation of the varied geometric cross sections in the composite core member. At the end of the processing system the various sections are combined at the end of the process to form the completed composite cable core that form a unitary (one-piece) body. Alternatively, the segments may be twisted to increase flexibility and facilitate winding.

The final composite core can be wrapped in lightweight high conductivity aluminum forming a composite cable. While aluminum is used in the title of the invention and in this description, the conductor may be formed from any highly conductive substance. In particular, the conductor may be any metal or metal alloy suitable for electrical cables. While aluminum is most prevalent, copper may also be used. It may also be conceivable to use a precious metal, such as silver, gold, or platinum, but these metals are very expensive for this type of application. In an exemplary embodiment, the composite core cable comprises an inner carbon core having an outer insulating glass fiber composite layer and two layers of trapezoidal formed strands of aluminum.

In one embodiment, the inner layer of aluminum comprises a plurality of trapezoidal shaped aluminum segments helically wound or wrapped in a counter-clockwise direction around the composite core member. Each trapezoidal section is designed to optimize the amount of aluminum and increase conductivity. The geometry of the trapezoidal segments allows for each segment to fit tightly together around the composite core member.

In a further embodiment, the outer layer of aluminum comprises a plurality of trapezoidal shaped aluminum segments helically wound or wrapped in a clockwise direction around the composite core member. An opposite direction of wrapping prevents twisting of the final cable. Each trapezoidal aluminum element fits tightly with the trapezoidal aluminum elements wrapped around the inner aluminum layer. The tight fit optimizes the amount of aluminum and decreases the aluminum required for high conductivity.

The final ACCC reinforced cable is created by surrounding the composite core with an electrical conductor.

EXAMPLE

An example of an ACCC reinforced cable in accordance with the present invention follows. An ACCC reinforced cable comprising four layers of components consisting of an inner carbon/epoxy layer, a next glass-fiber/epoxy layer, a Kapton surface material, and two or more layers of tetrahedral shaped aluminum strands. The strength member consists of an advanced composite T700S carbon/epoxy having a diameter of about 0.28 inches, surrounded by an outer layer of 250 yield Advantex E-glass-fiber/epoxy having a layer diameter of about 0.375 inches. The glass-fiber/epoxy layer is surrounded by an inner layer of nine trapezoidal shaped aluminum strands having a diameter of about 0.7415 inches and an outer layer of thirteen trapezoidal shaped aluminum strands having a diameter of about 1.1080 inches. The total area of carbon is about 0.06 in$^2$, of glass is about 0.05 in$^2$, of inner aluminum is about 0.315 in$^2$ and outer aluminum is about 0.53 in$^2$. The fiber to resin ratio in the inner carbon strength member is 65/35 by weight and the outer glass layer fiber to resin ratio is 60/40 by weight.

The specific specifications are summarized in the following table:

| E-Glass<br>Advantex Roving (250 Yield) | |
|---|---|
| Tensile Strength, Ksi | 770 |
| Elongation at Failure, % | 4.5 |
| Tensile Modulus, Msi | 10.5 |

| Carbon (graphite)<br>Carbon: Toray T700S (Yield 24K) | |
|---|---|
| Tensile strength, Ksi | 711 |
| Tensile Modulus, Msi | 33.4 |
| Strain | 2.1% |
| Density lbs/ft$^3$ | 0.065 |
| Filament Diameter, in | 2.8E-04 |

| Epoxy Matrix System | |
|---|---|
| Araldite MY 721 | |
| Epoxy value, equ./kg | 8.6–9.1 |
| Epoxy Equivalent, g/equ. | 109– |
| Viscosity @ 50 C., cPs | 3000–6000 |
| Density @ 25 C. lb/gal. | 1.1501.18 |
| Hardener 99-023 | |
| Viscosity @ 25 C., cPs | 75–300 |
| Density @ 25 C., lb/gal | 1.19–1/22 |
| Accelerator DY 070 | |
| Viscosity @25 C., cPs | <50 |
| Density @ 25 C., lb/gal | 0.95–1.05 |

In an alternate embodiment, S-Glass may be substituted for all or a portion of the E-glass in the above example. Values for S-Glass are presented in the table below.

| S-glass | |
|---|---|
| Tensile Strength, Ksi | 700 |
| Elongation at Failure, % | 5.6 |
| Tensile Modulus, Msi | 12.5 |

It is to be understood that the invention is not limited to the exact details of the construction, operation, exact materials, or embodiments shown and described, as modifications and equivalents will be apparent to one skilled in the art without departing from the scope of the invention.

We claim:

1. A composite core for an electrical cable comprising:

an inner core comprising a plurality of substantially continuous reinforcing fibers of at least a first type, the fiber type having a modulus of elasticity that exceeds the modulus of elasticity of glass fibers;

an outer core surrounding the inner core comprising a plurality of substantially continuous reinforcing fibers of at least a second type the fibers having a modulus of elasticity of or similar to glass fibers;

a cured resin matrix, wherein the fibers of the inner and the outer cores are embedded in said resin matrix; and a protective coating surrounding the outer composite core;

wherein, the fibers of the outer core are different from the fibers of the inner core and wherein, the fibers of the inner and the outer cores are oriented substantially parallel to the longitudinal axis.

2. A composite core as claimed in claim 1, wherein the fibers of the inner core comprise a modulus of elasticity in the range of about 15 to about 45 Msi.

3. A composite core as claimed in claim 1, wherein the fibers of the outer core comprise a modulus of elasticity in the range of at least about 6 Msi to about 15 Msi.

4. A composite core as claimed in claim 1 wherein the composite core is surrounded by at least one layer of conductor.

5. An electrical cable comprising:

a composite core further comprising:

an inner core comprising a plurality of substantially continuous reinforcing fibers of at least a first type, the fiber type having a modulus of elasticity that exceeds the modulus of elasticity of glass fibers;

an outer core surrounding the inner core comprising a plurality of substantially continuous reinforcing fibers of at least a second type, the fibers having a modudul of elasticity of or similar to glass fibers;

a cured resin matrix, wherein the fibers of the inner and the outer cores are embedded in said resin matrix; and a protective coating surrounding the outer core; and at least one layer of conductor surrounding the composite core;

wherein, the fibers of the outer core are different from the fibers of the inner core and wherein, the fibers of the inner and the outer cores are oriented substantially parallel to the longitudinal axis.

6. An electrical cable as claimed in claim 5, wherein the fibers of the inner core comprise a modulus of elasticity in the range of about 15 to about 46 Msi.

7. An electrical cable as claimed in claim 5, wherein the fibers of the outer core comprise a modulus of elasticity in the range of at least about 6 Msi to about 15 Msi.

8. A electrical cable as claimed in claim 5 wherein the composite core is surrounded by two layers of conductor.

9. An electrical cable comprising:

a composite core comprising two or more reinforcing fibers in a resin matrix, said core further comprising:

at least 50% fiber volume fraction, wherein at least one fiber comprises a modulus of elasticity at least about 15 (151 )GPA) to about 45 Msi (255 GPa) coupled with a coefficient of thermal expansion in the range of at least about 31 $0.6\times10^{-6}$/°C. to about $1.0\times10^{-5}$/°C. and a tensile strength at least about 250 ksi (2413 MPa) and at least one fiber comprises a modulus of elasticity of at least about 6 Msi, a coefficient of thermal expansion in the range of about $5\times10^{-6}$/°C. to about $10\times10^{-6}$/°C. and a tensile strength of at least about 180 Ksi (1241 MPa);

a protective coating surrounding the composite core; and at least one layer of conductor surrounding the protective coating.

10. An electrical cable as claimed in claim 9, wherein the two or more reinforcing fibers of the composite core are selected from the group consisting of carbon, basalt, glass, aramid, boron, liquid crystal fibers, high performance polyethylene, steel hardwire filaments, steel wire, steel fiber, high carbon steel cord with adhesion optimized coatings, high carbon steel cord without adhesion optimized coatings and carbon nanofibers.

11. A composite core as claimed in claim 9, wherein the two or more reinforcing fibers of the core are arranged to form an inner and an outer core and wherein, the fibers of the inner core comprise a modulus of elasticity in the range of about 15 to about 45 Msi and a tensile strength in the range of at least aobut 250 Ksi to about 1000 Ksi.

12. A composite core as claimed in claim 9, wherein the two or more reinforcing fibers of the core are arranged to form an inner and an outer core and wherein, the fibers of the outer core comprise a modulus of elasticity in the range of at least about 6 Msi to about 15 Msi and a tensile strength of at least about 180 Ksi to about 800 Ksi.

13. An electrical cable as claimed in claim 9 wherein the two or more reinforcing fibers are twisted.

14. An electrical cable as claimed in claim 9, wherein the protective coating is a tape, a gel coat, a film or a paint.

15. A composite core for an electrical cable, the core comprising:

a plurality of carbon fibers surrounded by a plurality of glass fibers;

a cured resin matrix wherein, the carbon and glass fibers are embedded within said resin matrix to form the core; and a protective coating surrounding the core.

16. A composite core as claimed in claim 15, wherein the protective coating comprises one of a paint, a gel coat, a tape or a film that functi9ons to protect the core from environmental factors and use and facilitates processing of the core.

17. A method of processing a composite core for an electrical cable comprising:

pulling two or more longitudinally oriented and substantially continuous fibers through a resin to form a fiber resin matrix;

removing excess resin from the fiber resin matrix;

processing the fiber resin matrix through at least one first die to compress the fibers to form the composite core, wherein the first die comprises one or more heating zones to begin catalyzation of the resin matrix;

introducing a protective coating;

applying the protective coating to the composite core;

processing the fiber resin matrix through at least one second die to compress the composite core and coating, wherein the second die comprises a temperature to cure the fiber resin matrix; and curing the composite core and coating.

18. A method as claimed in claim 17 wherein, the composite core comprises at least one fiber selected from the group consisting of: carbon, basalt, glass, aramid, boron, liquid crystal fibers, high performance polyethylene, steel hardwire filaments, steel wire, steel fiber, high carbon steel cord with adhesion optimized coatings, high carbon steeel cord without adhesion optimized coatings and carbon nanofibers.

19. A method as claimed in claim 17 wherein, the protective coating is a tape, gel coat, a film or a paint.

20. A method as claimed in claim 17 wherein, the step of applying the protective coating to the composite core further comprises using one or more carding plates to shape and compress the protective coating around the core.

* * * * *

UNITED STATES PATENT AND TRADEMARK OFFICE

CERTIFICATE OF CORRECTION

PATENT NO. : 7,179,522 C1
APPLICATION NO. : 90/011402
DATED : March 27, 2012
INVENTOR(S) : Clement Hiel et al.

It is certified that error appears in the above-identified patent and that said Letters Patent is hereby corrected as shown below:

Title Page, Section (73) Assignee:, delete “Partners for Growth II, L.P., San Francisco, CA (US)” and insert therefor --CTC Cable Corporation, Irvine, CA (US)--.

Signed and Sealed this
Fourteenth Day of August, 2012

David J. Kappos
*Director of the United States Patent and Trademark Office*

US007179522C1

(12) EX PARTE REEXAMINATION CERTIFICATE (8929th)

United States Patent

Hiel et al.

(10) Number: US 7,179,522 C1

(45) Certificate Issued: *Mar. 27, 2012

(54) ALUMINUM CONDUCTOR COMPOSITE CORE REINFORCED CABLE AND METHOD OF MANUFACTURE

(75) Inventors: Clement Hiel, Rancho Palos Verdes, CA (US); George Korzeniowski, Woodland Hills, CA (US); David Bryant, Laguna Beach, CA (US)

(73) Assignee: Partners for Growth II, L.P., San Francisco, CA (US)

Reexamination Request:
No. 90/011,402, Dec. 22, 2010

Reexamination Certificate for:

| | |
|---|---|
| Patent No.: | **7,179,522** |
| Issued: | **Feb. 20, 2007** |
| Appl. No.: | **10/971,629** |
| Filed: | **Oct. 22, 2004** |

( * ) Notice: This patent is subject to a terminal disclaimer.

Related U.S. Application Data

(63) Continuation-in-part of application No. 10/692,304, filed on Oct. 23, 2003, now Pat. No. 7,060,326, and a continuation-in-part of application No. 10/691,447, filed on Oct. 22, 2003, now Pat. No. 7,211,319.

(51) Int. Cl.

| | |
|---|---|
| ***B32B 27/04*** | (2006.01) |
| ***H02G 3/00*** | (2006.01) |

(52) U.S. Cl. ............... 428/300.7; 428/297.4; 428/298.1; 428/299.1; 428/299.4; 428/300.4; 428/378; 174/70 R; 174/102 R; 174/106 R; 174/113 C; 427/379; 427/389.7

(58) Field of Classification Search ........................ None
See application file for complete search history.

(56) References Cited

To view the complete listing of prior art documents cited during the proceeding for Reexamination Control Number 90/011,402, please refer to the USPTO's public Patent Application Information Retrieval (PAIR) system under the Display References tab.

*Primary Examiner*—Norca L Torres Velazquez

(57) ABSTRACT

This invention relates to an aluminum conductor composite core reinforced cable (ACCC) and method of manufacture. An ACCC cable has a composite core surrounded by at least one layer of aluminum conductor. The composite core comprises a plurality of fibers from at least one fiber type in one or more matrix materials. The composite core can have a maximum operating temperature capability above 100° C. or within the range of about −45° C. to about 240° C. or higher, at least 50% fiber to resin volume fraction, a tensile strength in the range of about 160 Ksi to about 370 Ksi, a modulus of elasticity in the range of about 7 Msi to about 37 Msi and a coefficient of thermal expansion in the range of about $-0.6\times10^{-6}$ per deg. C. to about $1.0\times10^{-5}$ per deg. C. According to the invention, unique processing techniques such a B-Staging and/or film-coating techniques can be used to increase production rates from a few feet per minute to sixty or more feet per minute.

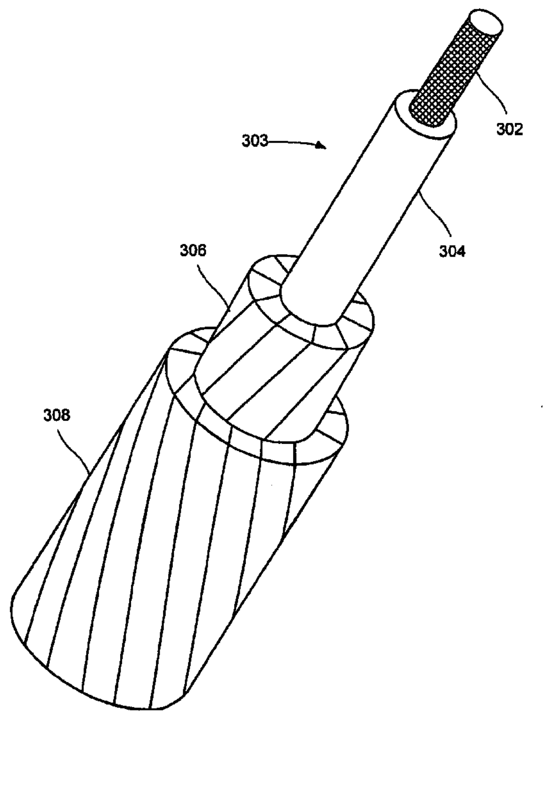

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 10, 11, 12 and 13 are cancelled.

Claims 1, 5-9 and 14-20 are determined to be patentable as amended.

Claims 2-4, dependent on an amended claim, are determined to be patentable.

New claims 21-24 are added and determined to be patentable.

1. A composite core for an *overhead* electrical cable comprising:

an inner core comprising a plurality of substantially continuous reinforcing fibers of at least a first type, the *first* fiber type *of the inner core* having a modulus of elasticity that exceeds the modulus of elasticity of glass fibers;

an outer core surrounding the inner core comprising a plurality of substantially continuous reinforcing fibers of at least a second type the [fibers] *second fiber type of the outer core* having a modulus of elasticity of or similar to glass fibers;

a cured resin matrix, wherein the fibers of the inner and the outer cores are embedded in said resin matrix; and a protective coating surrounding the outer composite core;

wherein, the fibers of the outer core are different from the fibers of the inner core and wherein, the fibers of the inner and the outer cores are oriented substantially parallel to the longitudinal axis *and wherein the composite core is adapted for use as a strength member in an overhead electrical cable*.

5. An *overhead* electrical cable comprising:

a *single* composite core *strength member* further comprising:

an inner core comprising a plurality of substantially continuous reinforcing fibers of at least a first type, the fiber type having a modulus of elasticity that exceeds the modulus of elasticity of glass fibers;

an outer core surrounding the inner core comprising a plurality of substantially continuous reinforcing fibers of at least a second type, the fibers having a [modudul] *modulus* of elasticity of or similar to glass fibers;

a cured resin matrix, wherein the fibers of the inner and the outer cores are embedded in said resin matrix; and a protective coating surrounding the outer core; and at least one layer of conductor surrounding the *single* composite core *strength member*;

wherein, the fibers of the outer core are different from the fibers of the inner core and wherein, the fibers of the inner and the outer cores are oriented substantially parallel to the longitudinal axis.

6. An *overhead* electrical cable as claimed in claim 5, wherein the fibers of the inner core comprise a modulus of elasticity in the range of about 15 to about 46 Msi.

7. An *overhead* electrical cable as claimed in claim 5, wherein the fibers of the outer core comprise a modulus of elasticity in the range of at least about 6 Msi to about 15 Msi.

8. [A] *An overhead* electrical cable as claimed in claim 5 wherein the composite core *strength member* is surrounded by two layers of conductor.

9. An *overhead* electrical cable comprising:

a composite core comprising two or more reinforcing fibers in a resin matrix, said core further comprising:

at least 50% fiber volume fraction, wherein at least one fiber comprises a modulus of elasticity at least about 15 (151 [)] GPA) to about 45 Msi (255 GPa) coupled with a coefficient of thermal expansion in the range of at least about [31 0.6] *–0.6*$\times 10^{-6}$/° C. to about 1.0$\times 10^{-5}$/° C. and a tensile strength *of* at least about 250 [ksi] *Ksi* (2413 MPa) and at least one fiber comprises a modulus of elasticity of at least about 6 Msi, a coefficient of thermal expansion in the range of about 5×10–$^{6}$/° C. to about 10$\times 10^{-6}$/° C. and a tensile strength of at least about 180 Ksi (1241 MPa);

a protective coating surrounding the composite core;

and at least one layer of conductor surrounding the protective coating,

*wherein the two or more reinforcing fibers of the core are arranged to form an inner core and an outer core and wherein the fibers of the inner core comprise a modulus of elasticity in the range of about 15 to about 45 Msi and a tensile strength in the range of at least about 250 Ksi to about 1000 Ksi, and wherein the fibers of the outer core comprise a modulus of elasticity in the range of at least about 6 Msi to about 15 Msi and a tensile strength of at least about 180 Ksi to about 800 Ksi.*

14. An *overhead* electrical cable as claimed in claim 9, wherein the protective coating is a tape, a gel coat, a film or a paint.

15. A composite core for an *overhead* electrical cable, the core comprising:

a plurality of carbon fibers surrounded by a plurality of glass fibers;

a cured resin matrix wherein, the carbon and glass fibers are embedded within said resin matrix to form the core; and a protective coating surrounding the core*;*

*wherein the cured resin matrix has an elongation of greater than about 3% and wherein the composite core is adapted for use as a strength member in an overhead electrical cable*.

16. A composite core as claimed in claim 15, wherein the protective coating comprises one of a paint, a gel coat, a tape or a film that [functi9ons] *functions* to protect the core from environmental factors and use and facilitates processing of the core.

17. A method of processing a composite core for *use as a strength member in* an *overhead* electrical cable comprising:

pulling two or more longitudinally oriented and substantially continuous fibers through a resin to form a fiber resin matrix;

removing excess resin from the fiber resin matrix;

processing the fiber resin matrix through at least one first die to compress the fibers to form the composite core, wherein the first die comprises one or more heating zones to begin catalyzation of the resin matrix;

introducing a protective coating;

applying the protective coating to the composite core;

processing the fiber resin matrix through at least one second die to compress the composite core and coating, wherein the second die comprises a temperature to cure the fiber resin matrix; and curing the composite core and coating *to form a composite core that is adapted for use as a strength member in an overhead electrical cable*.

18. A method as claimed in claim 17 wherein, the composite core comprises at least one fiber selected from the group consisting of: carbon, basalt, glass, aramid, boron, liquid crystal fibers, high performance polyethylene, steel hardwire filaments, steel wire, steel fiber, high carbon steel cord with adhesion optimized coatings, high carbon [steeel] *steel* cord without adhesion optimized coatings and carbon nanofibers.

*21. An overhead electrical cable as claimed in claim 9, wherein the overhead electrical cable comprises a single composite core strength member and wherein the protective coating surrounds the composite core strength member.*

*22. A composite core as claimed in claim 1, wherein the cured resin matrix has an elongation of greater than about 3%.*

*23. A composite core as claimed in claim 15, wherein the composite core has a tensile strength of greater than about 200 Ksi, a modulus of elasticity of greater than about 7 Msi and a coefficient of thermal expansion below $1.0\times10^{-5}$/° C.*

*24. A composite core as claimed in claim 15, wherein the composite core has a tensile strength in the range of about 200 Ksi to about 380 Ksi, a modulus of elasticity within the range of about 7 Msi to about 37 Msi and a coefficient of thermal expansion within the range of about $-0.6\times10^{-6}$ to about $1.0\times10^{-5}$/° C.*

* * * * *